Oct. 23, 1956    R. L. BLAKE    2,767,806
WET DUST SEPARATOR
Filed July 2, 1953    2 Sheets-Sheet 1
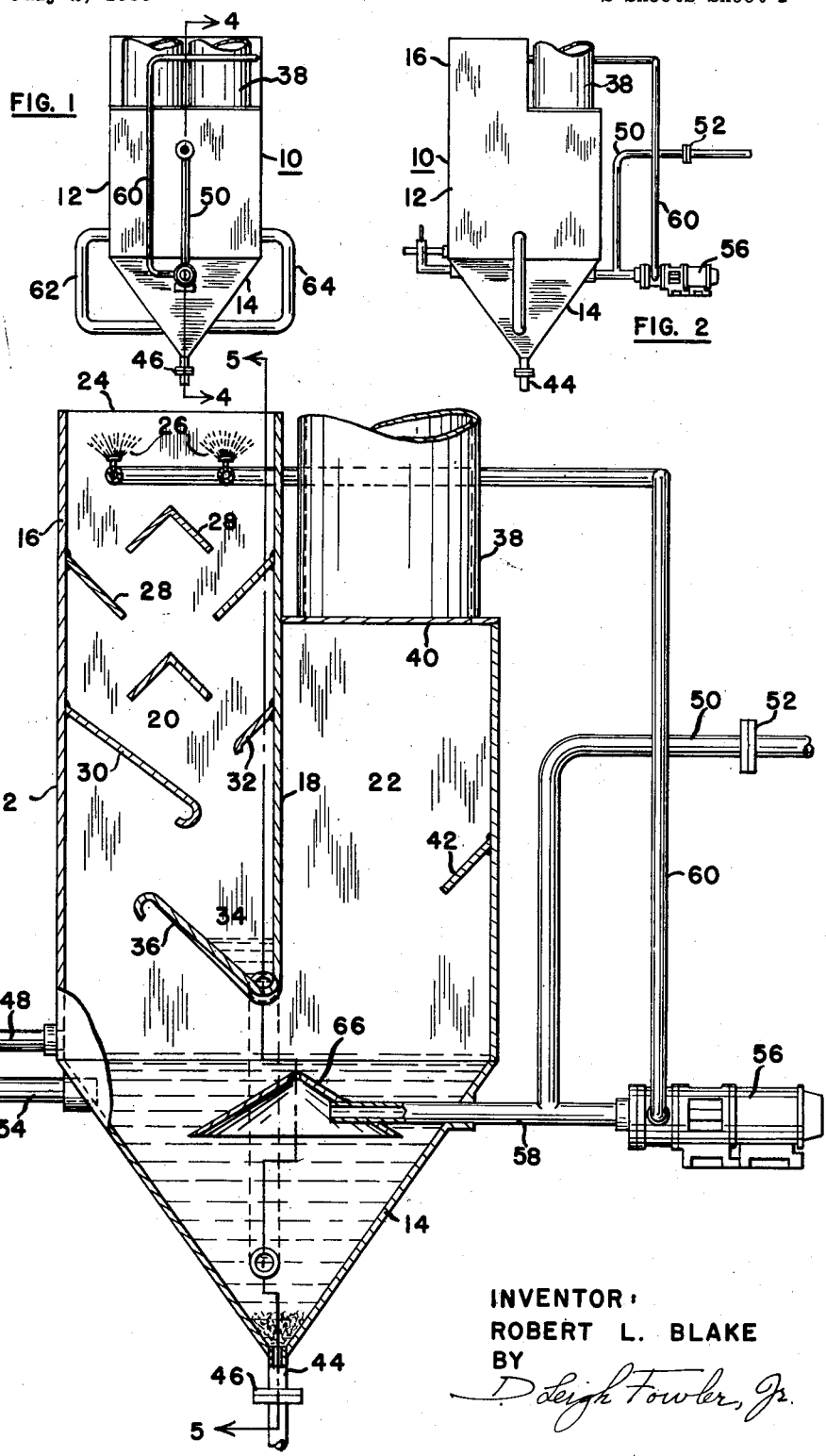
INVENTOR:
ROBERT L. BLAKE
BY
D. Leigh Fowler, Jr.

Oct. 23, 1956 — R. L. BLAKE — 2,767,806
WET DUST SEPARATOR
Filed July 2, 1953 — 2 Sheets-Sheet 2

INVENTOR
ROBERT L. BLAKE
BY
D. Leigh Fowler, Jr.

United States Patent Office 2,767,806
Patented Oct. 23, 1956

2,767,806
WET DUST SEPARATOR

Robert L. Blake, Jenkins, Ky.

Application July 2, 1953, Serial No. 365,645

3 Claims. (Cl. 183—22)

This invention relates to the art of removing dust from dust-laden gases and, more particularly, to an improved dust separating system employing a scrubbing liquid.

In accordance with my invention, the stream of dust-laden gas is passed downwardly in a tortuous path through a liquid spray chamber. The dust is wetted by the liquid spray and carried downwardly to a collector which serves to remove most of the dust-laden liquid from the path of the gas stream. The latter still retains entrained liquid and residual dust. It then impinges against a body of liquid at the bottom of the spray chamber and thence upwardly thru a vertical exhaust chamber. The effective cross-sectional area of the exhaust chamber is greater than that of the spray chamber. Accordingly not only is the direction of flow of the gas stream reversed while in contact with the body of liquid but also its velocity is sharply reduced. As a result substantially all the entrained liquid and residual dust are deposited upon the body of liquid. The gas then leaves the exhaust chamber in a dust-free state.

The primary features of my invention include firstly the removal of the major portion of the wetted dust from the gas stream immediately following the scrubbing action of the liquid, that is, at the point of most effective wetting of the dust particles. Secondly, the remaining dust carried by the entrained liquid is substantially removed by direct impingement upon a body of the liquid while both the direction of flow and the velocity of the gas stream are being concurrently changed. Thirdly, as will be more fully described below, the apparatus for carrying out my invention is compact, easily and cheaply constructed, and simple to operate.

A better understanding of my invention, its other objects and advantages, will become apparent upon reference to the following description of the preferred embodiment and to the accompanying drawings in which:

Figure 1 is a view in elevation of one side of the preferred embodiment of apparatus of my invention;

Figure 2 is a view in elevation of another side of the apparatus shown in Figure 1;

Figure 4 is an enlarged view along lines 4—4 of Figure 1, partly in section and partly in elevation.

Figure 3:
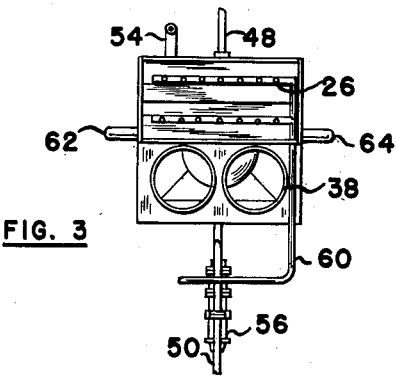
Figure 3 is a top view in elevation of the apparatus as shown in Figure 1.

Referring to the drawings, numeral 10 designates a wet dust separator embodying my invention. It comprises a sheet metal housing having a rectangular box-like mid-section 12, an inverted pyramidal shaped bottom section 14 joined to the bottom of the mid-section, and a rectangular shaped top section 16 joined to a top portion of the mid-section. Three walls of the top section 16 are simply extensions of the walls of the mid-section 12. A partition wall 18 (Figure 4) extends downwardly from the fourth wall of the top section 16 through the mid-section 12 to a point a short distance above the pyramidal bottom section 14; and divides the interior into two sections, 20 and 22.

Section 20 is coextensive with the interior of top section 16 and together they constitute a gas intake and scrubbing zone of the dust collector. Section 16 has a top opening 24 for the entering dust-laden gas stream. A plurality of high pressure liquid sprays 26 in the top section 16 serve to spray liquid upwardly countercurrent to the entering gas stream. A plurality of baffles 28 supported by the housing walls extend downwardly at an angle to provide a tortuous passageway for the entering gas stream and also to provide a series of surfaces over which flows the liquid from the sprays 26. The lowermost baffles 30 and 32 are arranged to direct the flow of liquid into a collector 34 formed by the partition 18 and an upwardly extending baffle 36 which extends across one side of section 20.

Section 22 is the exhaust section of the dust separator and has two exhaust stacks 38 in its top wall 40. The interior of section 22 is free of baffles except for one designated 42 that extends downwardly for the prevention of liquid creeping up the side wall. The cross-sectional area of the effective gas passageway in section 22 is substantially greater than that provided in section 20 because of the obstructing baffles in the latter.

The bottom pyramidal section 14 serves as a liquid reservoir. It has a discharge conduit 44 at its apex with an orifice valve 46 to regulate rate of discharge. An over-flow conduit 48 near the top of the section keeps the liquid in the reservoir below a definite level.

Figure 5:
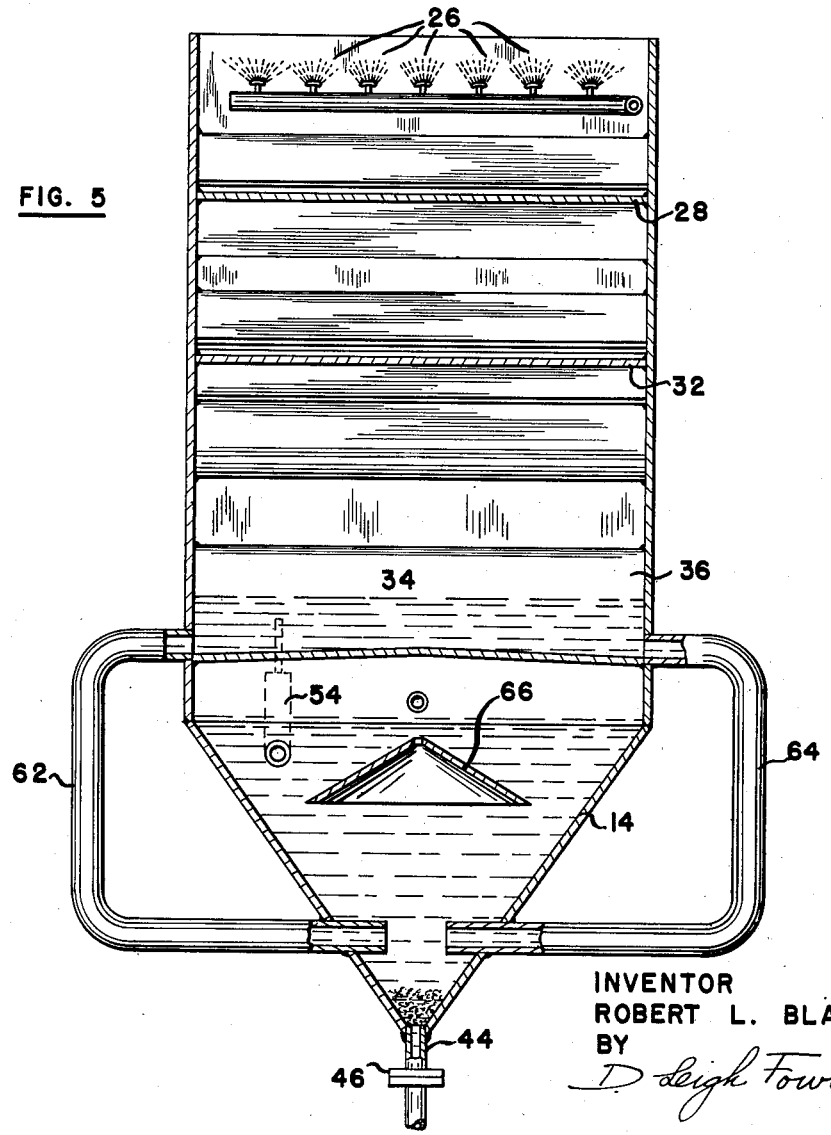
Figure 5 is a view along lines 5—5 of Figure 4.

A conduit 50 having an orifice valve 52 admits make-up liquid to the collector from a suitable outside source. The valve 52 is controlled by a float assembly 54 in conventional manner (not shown). A recirculating pump 56 draws liquid from section 14 near the top thereof through a conduit 58 and through conduit 50 as required, and pumps the liquid under pressure through conduit 60 to the sprays 26. A pair of corresponding conduits 62 and 64 carry liquid from the collector 34 outside the collector housing and back into the bottom of the pyramidal section 14 (Figure 5). An inverted conical shield 66 is provided in the section 14 above the end of conduit 58 to protect the pump intake. An air hole in the top of the shield prevents a pocket of gas from forming in the top of the shield.

The operation of my improved dust separator will now be described as applied to the removal of coal particles from an air stream discharged from a coal preparation plant. In this application, water is used as the liquid scrubbing agent. In other applications where water is objectionable because of reaction with the carrier gas or for other reasons, any suitable inert liquid may be used.

The coal laden air stream enters the intake section 16. Preferably there is a drop in velocity upon entering the separator in order to provide a longer residence time in the scrubbing zone. This can be effected by making the gas passageway in sections 16 and 20 larger than the conduit (not shown) that brings the gas stream to the collector. The entering air stream is saturated by the countercurrent stream of water from sprays 26. The water pumped to these is preferably at elevated temperature to promote a high degree of saturation. The saturated air stream together with entrained dust and water passes downwardly in a tortuous path between the baffles 28 in a highly turbulent state and impinges upon the wetted upper surfaces of the baffles. The major portion of the coal particles is picked up by the water and carried to the lowermost baffles 30 and 32. The latter direct the coal laden water to the collector 34 and thence by conduits 62 and 64 to the bottom portion of the water reservoir in section 14.

The air stream as it reaches the bottom of section 20 still contains considerable water with the residue of coal dust. It then impinges against the surface of the water confined in the pyramidal section 14. The level of the water is maintained at the juncture of sections 14 and 12 by means of the over-flow conduit 48 and automatic make-up through conduit 50 under control of the float assembly 54. Following impingement of the air stream against the water, its direction of flow is completely reversed as it enters the exhaust section 22. At the same time its velocity is sharply reduced. The extent of the reduction in velocity depends upon the relative dimensions of the effective gas passageways in the two sections, and the initial velocity of the gas stream. The impingement against the water, reversal of direction of flow, and reduction in velocity cooperate to effect substantial deposition of the entrained water with its residual dust content. The particle free air is discharged through stacks 38. Any tendency of the water to creep up the outer wall of section 22 is prevented by baffle 42.

The particles contained in the water deposited in section 14 settle to the bottom apex. Together with the larger portion of dust from collector 34 it is drained through conduit 44. Substantially dust free water is recirculated through conduit 58 for reuse in the system. The shield 66 prevents settling particles from entering conduit 58.

By way of example, the gas stream from a coal preparation plant was passed through a dust separator conforming to the above general description. The housing was of mild steel. The gas stream in the duct leading to the separator moved at a velocity of 46,000 cubic feet per minute. The coal dust load of the inlet gas was 250–500 grains per 100 cubic feet. The particle size composition of the inlet dust is given in the following table.

| Microns: | Weight percent |
|---|---|
| 0–10 | 10 |
| 10–20 | 22 |
| 20–30 | 30 |
| 30–40 | 22 |
| 40–50 | 16 |
|  | 100 |

The outlet dust load from the separator was 1–10 grains per 100 cubic feet.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. Apparatus for separating suspended dust from a stream of gas which comprises, in combination, a vertically extending spray chamber having a top opening for receiving a dust-laden gas stream, a plurality of vertically spaced downwardly inclined baffle members arranged in said chamber to leave an open passageway for the gas stream, means for spraying liquid into the upper portion of said chamber for successive flow over the upper sides of said baffle members, a substantially unobstructed exhaust chamber having an opening through which dust-free gas may be discharged, said exhaust chamber having an effective gas stream passageway of larger cross-section than that of said spray chamber, said two chambers being in open communication at the bottoms thereof for the passage of gas from said spray chamber to said exhaust chamber, a liquid chamber disposed below said chambers for holding a body of liquid the upper surface of which forms, in effect, at least part of the bottom gas confining wall of said first two mentioned chambers, collecting means arranged in said spray chamber in spaced relation to the upper surface of said liquid for collecting the dust-laden liquid flowing from said baffle members, and means for conducting said collected liquid to said liquid chamber out of contact with said gas stream.

2. Apparatus for separating suspended dust from a stream of gas which comprises, in combination, a vertically extending spray chamber having a top opening for receiving a dust-laden gas stream, a plurality of vertically spaced downwardly inclined baffle members arranged in said chamber to leave an open passageway for the gas stream, means for spraying liquid into the upper portion of said chamber for successive flow over the upper sides of said baffle members, a vertically extending substantially unobstructed exhaust chamber having a top opening through which dust-free gas may be discharged, said exhaust chamber having an effective gas stream passageway of larger cross-section than that of said spray chamber, said two chambers being in open communication at the bottoms thereof for the passage of gas from said spray chamber to said exhaust chamber, a liquid chamber disposed below said chambers for holding a body of liquid the upper surface of which forms, in effect, at least part of the bottom gas confining wall of said first two mentioned chambers, collecting means arranged in said spray chamber in spaced relation to the upper surface of said liquid for collecting the dust laden liquid flowing from said baffle members, means for conducting said collected dust-laden liquid to the bottom of said liquid chamber out of contact with said gas stream, means for withdrawing liquid from the bottom of said liquid chamber, means for recirculating liquid from the upper portion of said liquid chamber to said spray chamber, and means for maintaining the level of liquid in said liquid chamber substantially constant.

3. Apparatus for separating suspended dust from a stream of gas which comprises, in combination, a sheet metal housing having vertical side walls and an inverted pyramidal-shaped bottom wall, a vertical partition wall arranged within said housing to divide the interior thereof into two vertical passageways communicating only below said partition, a plurality of vertically spaced downwardly inclined sheet metal baffle members arranged in one of said passageways, means for spraying liquid into the upper portion of said latter passageway for successive flow over the upper sides of said baffle members, an upwardly inclined sheet metal baffle member arranged below the lowermost of said aforementioned baffle members for collecting the liquid flowing therefrom, means for maintaining a reservoir of liquid in said pyramidal-shaped bottom wall at a level below the bottom edge of said partition, conduit means for conducting the liquid collected by said upwardly inclined baffle member to a point below the level of liquid in said bottom wall, means for withdrawing liquid from the lower portion of said reservoir, and means for recirculating liquid from the upper portion of said reservoir for use as the aforementioned spraying liquid.

References Cited in the file of this patent

UNITED STATES PATENTS

| 1,007,356 | Hopper et al. | Oct. 31, 1911 |
| 1,980,522 | Hawley | Nov. 13, 1934 |
| 2,337,983 | Fisher | Oct. 28, 1943 |
| 2,585,440 | Collins | Feb. 12, 1952 |
| 2,675,215 | Otto | Apr. 13, 1954 |

FOREIGN PATENTS

| 479,857 | Great Britain | Feb. 14, 1938 |